Figure 1:
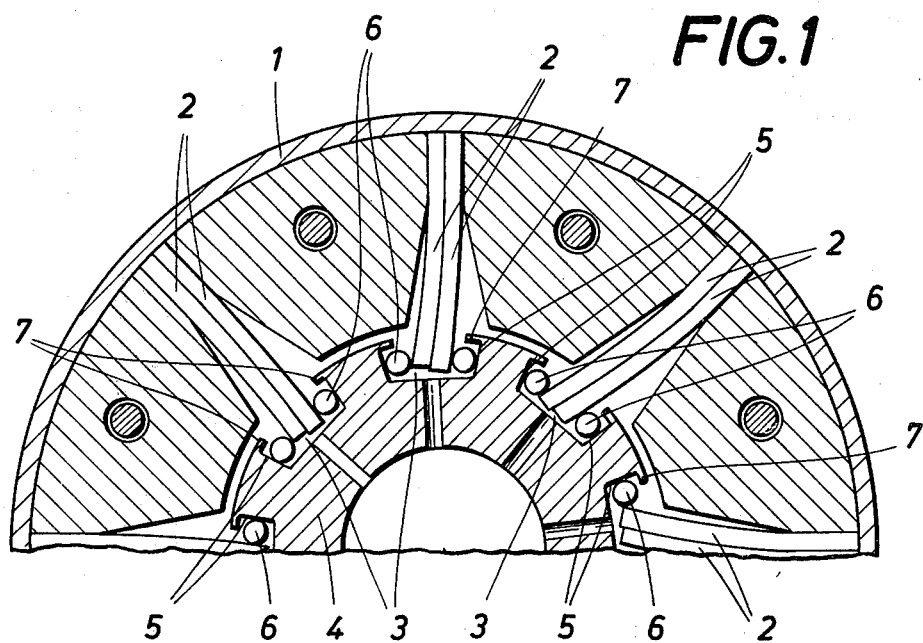

United States Patent [19]

Pfeifer

[11] 4,262,499

[45] Apr. 21, 1981

[54] TORSIONALLY ELASTIC VIBRATION-DAMPING MECHANISM

[75] Inventor: Peter Pfeifer, Mattsee, Austria

[73] Assignee: Dr. Ing. Geislinger & Co. Schwingungstechnik Gesellschaft m.b.H., Salzburg, Austria

[21] Appl. No.: 21,242

[22] Filed: Mar. 15, 1979

[30] Foreign Application Priority Data

Mar. 22, 1978 [AT] Austria .................................. 2022/78

[51] Int. Cl.³ ............................................. F16D 3/14
[52] U.S. Cl. ................................................. 64/27 L
[58] Field of Search ................. 4/27 L, 15 R, 15 B, 4/27 R, 27 B

[56] References Cited

U.S. PATENT DOCUMENTS

| B 509,043 | 2/1976 | Geislinger | 64/27 L |
|---|---|---|---|
| 1,698,309 | 1/1929 | Lewis | 64/27 L |
| 1,965,024 | 7/1934 | Allen | 64/27 L |
| 2,029,516 | 2/1936 | Tower | 64/27 L |
| 2,106,823 | 2/1938 | Alben | 64/27 L |
| 2,379,175 | 6/1945 | Mulheim | 64/27 L X |
| 3,013,413 | 12/1961 | Luning | 64/27 L |
| 3,996,767 | 12/1976 | Geislinger | 64/27 L |
| 4,191,032 | 3/1980 | August | 64/27 L |

FOREIGN PATENT DOCUMENTS 1298735  6/1972  France ..................................... 64/27 L Primary Examiner—Henry K. Artis
Attorney, Agent, or Firm—Kurt Kelman

[57] ABSTRACT

A torsionally elastic vibration-damping and/or coupling mechanism has torque-transmitting, radial leaf springs, which at one end are gripped in an outer member and at the other end engage grooves of an inner member. To impart such a damping or coupling device a particularly long life by avoiding unfavorable friction conditions, rolling elements are disposed in the grooves between the leaf springs and the sides of the grooves.

7 Claims, 2 Drawing Figures

U.S. Patent    Apr. 21, 1981    4,262,499

TORSIONALLY ELASTIC VIBRATION-DAMPING MECHANISM

This invention relates to a torsionally elastic vibration-damping and/or coupling mechanism having torque-transmitting, radial leaf springs, which at one end are gripped in an outer member of the mechanism and at the other end engage grooves of an inner member.

In the previously known mechanisms of this kind, the ungripped, free end of the leaf springs serving to transmit torque between the outer and inner members directly engage the side faces of the grooves and will slide on the sides of the grooves in response to any change of the load and of any radial displacement of the inner member relative to the outer one. The conditions existing in such known mechanisms do not permit of a hydrodynamic lubrication but result in mixed friction, which may adversely affect the life of such mechanism.

It is an object of the invention to eliminate these disadvantages and to provide a mechanism which is of the kind described first hereinbefore and which has a particularly long life, unfavorable friction conditions by simple means.

This object is accomplished according to the invention by disposing rolling elements in the grooves between the leaf springs and the side faces of the grooves. As a result, the leaf springs bear on the side faces of the grooves indirectly through the intermediary of rolling elements so that the sliding friction is replaced by rolling friction. Whereas this is accomplished without a considerable additional expenditure, it results in greatly improved operating conditions and in a considerably prolonged life.

To minimize the additional expenditure, the rolling elements may be provided within the scope of the invention only at those groove side faces against which the leaf springs bear to transmit the main torque.

In accordance with a preferred feature of the invention the side faces of the grooves are inclined from the radial direction to match the deflection of the end portions of the leaf springs during the transmission of the torque. As a result, the rolling elements lie under normal operating conditions between two parallel surfaces so that a satisfactory rolling motion is ensured during any change of position and/or load.

To enable a positioning of the rolling elements in the grooves so that the rolling elements are freely movable but cannot fall out of the grooves, the side faces of the grooves may be provided within the scope of the invention at their free edges with an inwardly projecting ledge.

To ensure that this projecting ledge is clear of the adjacent leaf spring, the diameter of the rolling element contacting the adjacent side face of the groove preferably exceeds the extent to which the ledge projects from said side face.

In order to avoid an irregular axial distribution of the load on the rolling elements, it will be desirable to provide a plurality of rolling elements which are aligned in the longitudinal direction of the groove.

The fatigue limit of the cooperating parts may be increased, in accordance with a preferred further feature of the invention, by hardening the surfaces of the rolling elements and those surfaces of the leaf springs and of the sides of the grooves which are contacted by the rolling elements.

Figure 2:
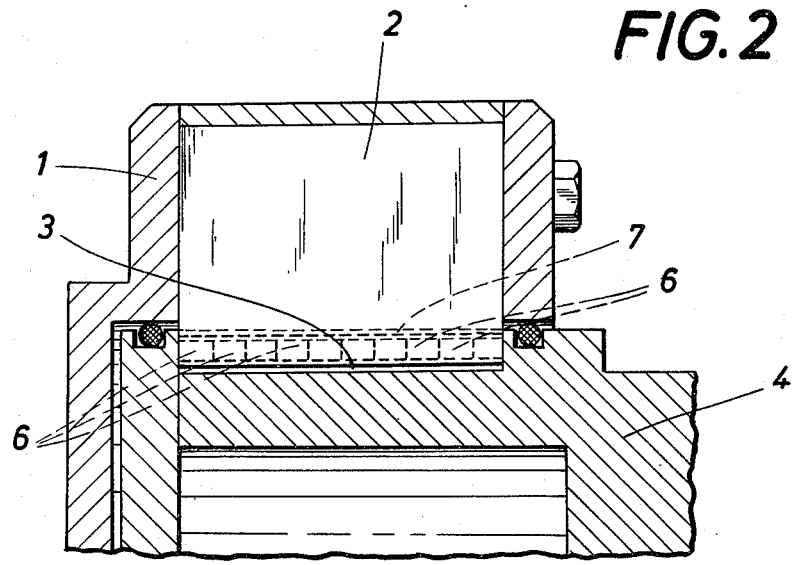

An illustrative embodiment of the invention is diagrammatically shown on the accompanying drawing, in which FIGS. 1 and 2 are respectively, are a transverse sectional view and an axial sectional view showing a damping or coupling mechanism according to the invention.

Radial leaf springs 2 are gripped in an outer member 1 of a damping and/or coupling mechanism and have free ends which engage grooves 3 of an inner member 4. To prevent a sliding contact between the leaf springs 2 and the side faces 5 of the grooves during a relative movement of the inner and outer members, rollers 6 are disposed in the grooves 3 between the leaf springs 2 and the side faces 5 of the grooves and the leaf springs bear on the sides of the grooves by means of said rollers in order to transmit torque. As a result, a change of the load or a radial change of the relative position of the inner and outer members will result in a rolling movement of the rollers 6 so that there will be only rolling friction between the leaf springs 2 and the rollers 6 and between the rollers 6 and the side faces 5 of the groove so that the wear is minimized and the life of the damper or coupling is considerably prolonged. To permit the rollers to be freely inserted into the grooves 3 and to prevent the rollers 6 from falling out of the grooves, the sides 5 of the grooves are provided at their upper edge with an inwardly projecting ledge 7, which is held clear of the adjacent leaf spring 2 by the roller 6 in contact with the adjacent side face 5 because the diameter of roller 6 exceeds the extent by which the ledge 7 protrudes from the side face. The sides 5 have such an inclination that during the transmission of the torque the end portions of the leaf springs are approximately parallel to those groove side faces on which they bear through the intermediary of the interposed rollers (FIG. 1). This arrangement results in satisfactory loading and motion conditions as regards rollers 6. To enable an adaptation to an irregular axial distribution of the load which is transmitted from the leaf springs 2 to the rollers 6, a series of rollers are aligned in the longitudinal direction of the respective groove (FIG. 2).

What is claimed is
1. A torsionally elastic, vibration-damping mechanism comprising
   (a) an annular outer member,
   (b) an inner member surrounded by the outer member, the inner member having a peripheral surface facing the outer member and defining a plurality of grooves, each of the grooves having two longitudinally extending side faces facing each other and extending inwardly from respective edges at the peripheral surface,
   (b) a like plurality of torque-transmitting leaf springs extending generally radially between the outer and inner members, one end of each leaf spring being gripped in the outer member and an opposite end thereof being freely received in a respective one of the grooves, and
   (c) at least one rolling element disposed between the opposite free end of the leaf spring and at least one side face in the respective groove, the rolling element being in rolling contact with the side face and the leaf spring end.
2. The mechanism of claim 1, wherein at least one rolling element is disposed between the opposite free end of the leaf spring and each side face in the respective groove.

3. The mechanism of claim 1, wherein the leaf springs assume a deflection in response to a torque transmission between the outer and inner members and the side faces of the grooves extend at an angle to the radial direction to match the deflection.

4. The mechanism of claim 1, further comprising ledges extending towards each other from the respective edges of the grooves at the peripheral surface, the leaf springs being received in the grooves between the ledges.

5. The mechanism of claim 4, wherein the rolling element has a diameter exceeding the distance by which the ledge projects from the respective edge.

6. The mechanism of claim 1, comprising a series of said rolling elements disposed along the longitudinally extending side face in alignment with each other.

7. The mechanism of claim 1, wherein the surface of the roller and surface areas of the leaf spring and the side face in rolling contact therewith are hardened.

* * * * *